(12) United States Patent
Sheridan

(10) Patent No.: US 8,777,793 B2
(45) Date of Patent: Jul. 15, 2014

(54) FAN DRIVE PLANETARY GEAR SYSTEM INTEGRATED CARRIER AND TORQUE FRAME

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 266 days.

(21) Appl. No.: 13/095,308

(22) Filed: Apr. 27, 2011

(65) Prior Publication Data

US 2012/0277055 A1 Nov. 1, 2012

(51) Int. Cl.
*F16H 57/04* (2010.01)

(52) U.S. Cl.
USPC .......................................... 475/160; 475/331

(58) Field of Classification Search
USPC .................. 475/159, 160, 331, 346
See application file for complete search history.

(56) References Cited

U.S. PATENT DOCUMENTS

| | | | | |
|---|---|---|---|---|
| 1,586,309 | A | * | 5/1926 | Hult .............................. 475/335 |
| 2,281,875 | A | * | 5/1942 | Gleissner .......................... 38/44 |
| 2,749,778 | A | * | 6/1956 | Kuhn .............................. 475/347 |
| 3,227,006 | A | * | 1/1966 | Bowen, Jr. ..................... 475/347 |
| 3,257,869 | A | * | 6/1966 | Sharples ........................ 475/347 |
| 3,352,178 | A | * | 11/1967 | Lindgren et al. .............. 475/343 |
| 3,635,103 | A | * | 1/1972 | Monti ............................ 475/346 |
| 3,960,029 | A | * | 6/1976 | Eichinger ........................ 74/413 |
| 4,524,643 | A | * | 6/1985 | Ziegler et al. .................. 475/345 |
| 5,102,379 | A | | 4/1992 | Pagluica et al. |
| 5,391,125 | A | | 2/1995 | Turra et al. |
| 5,433,674 | A | | 7/1995 | Sheridan et al. |
| 5,466,198 | A | | 11/1995 | McKibbin et al. |
| 6,223,616 | B1 | | 5/2001 | Sheridan |
| 6,663,530 | B2 | | 12/2003 | Poulin et al. |
| 7,033,301 | B2 | * | 4/2006 | Kimes ........................... 475/340 |
| 7,220,057 | B2 | * | 5/2007 | Hoppe .......................... 384/280 |
| 7,223,197 | B2 | | 5/2007 | Poulin et al. |
| 7,537,537 | B2 | * | 5/2009 | Smet et al. .................... 475/159 |
| 7,704,178 | B2 | | 4/2010 | Sheridan et al. |
| 7,883,439 | B2 | | 2/2011 | Sheridan et al. |
| 2010/0105516 | A1 | | 4/2010 | Sheridan et al. |
| 2010/0154217 | A1 | | 6/2010 | Sheridan et al. |
| 2010/0247015 | A1 | | 9/2010 | Montagu et al. |

OTHER PUBLICATIONS

U.S. Appl. No. 12/644,848, filed Dec. 22, 2009 entitled, "Coupling System for a Star Gear Train in a Gas Turbine Engine".
U.S. Appl. No. 12/902,525, filed Oct. 12, 2010 entitled, "Planetary Gear System Arrangement With Auxiliary Oil System".
Vibration Monitoring of UH-60A Main Transmission Planetary Carrier Fault by Jonathan A. Keller and Paul Grabill presented at the American Helicopter Society 59th Annual Forum, Phoenix, Arizona, May 6-8, 2003, Copyright 2003 by the American Helicopter Society International, Inc. (11 pages).

* cited by examiner

*Primary Examiner* — Justin Holmes
(74) *Attorney, Agent, or Firm* — Carlson, Gaskey & Olds, P.C.

(57) ABSTRACT

A fan gear drive system includes a torque frame having a base with integrated gear shafts circumferentially spaced relative to one another. A fan shaft is integrated with the base, such that the torque frame provides rotational output from the fan gear drive system. Each shaft provides a shaft axis. A bearing assembly is mounted on each of the gear shafts and provides a bearing assembly. The bearing assembly includes a spherical bearing configured to permit angular movement of the bearing axis relative to the shaft axis.

17 Claims, 6 Drawing Sheets

US 8,777,793 B2

FAN DRIVE PLANETARY GEAR SYSTEM INTEGRATED CARRIER AND TORQUE FRAME

BACKGROUND

This disclosure relates to a fan drive gear system integrated carrier and torque frame.

One type of gas turbine engine includes a fan drive gear system that is mechanically arranged between the turbo-machinery of the engine and a fan. The turbo-machinery is composed of two concentric shafts rotating at different speeds containing independent compressors and turbines. The turbo-machinery rotationally drives the fan, via the gear system, to move fluid through a nacelle, which divides the fluid flow into two streams. An inner stream supplies the turbo-machinery and the outer stream consists of fluid which bypasses the inner stream and is solely compressed and moved by the fan.

Typically the fan drive gear system is provided by an epicyclic gear train and includes a centrally located input gear driven by the turbo-machinery, intermediate gears circumferentially arranged about and intermeshing with the input gear and a ring gear provided about and intermeshing the intermediate gears. Depending upon the configuration, either the intermediate gears or the ring gear rotationally drives the fan in response to rotation of the input gear.

The intermediate gears are typically supported in a carrier by a journal extending between spaced apart walls of the carrier. The carrier is typically constructed from a high strength metallic alloy such as steel, titanium or nickel. The carrier is bolted to a torque frame, which is secured to fixed structure or rotating structure depending upon the particular type of gear system.

One type of gear system for helicopter applications has been used which directly supports the intermediate gears on an integrated carrier and torque frame. This integrated torque frame includes shafts that directly support the intermediate gears in a cantilevered fashion by conventional rolling element bearings. This arrangement is subjected to vibrational stresses that may cause the integrated torque frame to fail.

SUMMARY

A fan gear drive system includes a torque frame having a base with integrated gear shafts circumferentially spaced relative to one another. A fan shaft is integrated with the base, and each shaft provides a shaft axis. A bearing assembly is mounted on each of the gear shafts and provides a bearing axis. The bearing assembly includes a spherical bearing configured to permit angular movement of the bearing axis relative to the shaft axis.

A fan drive gear drive lubrication system includes a torque frame supporting multiple gears and has at least one lubrication passage. An oil baffle is secured to the torque frame and includes a central opening and multiple circumferentially spaced gear pockets arranged about the central opening to receive the multiple gears. The oil baffle includes at least one lubrication passageway in fluid communication with the lubrication passage. At least one tube extends between and fluidly interconnects the lubrication passage and passageway.

A method of assembling a fan drive gear system includes the step of installing a spherical bearing into a race to provide a bearing assembly. The bearing assembly is mounted onto a shaft of a torque frame. The torque frame is supported in a front bearing housing by bearings. An intermediate gear is installed onto the bearing assembly.

BRIEF DESCRIPTION OF THE DRAWINGS

The disclosure can be further understood by reference to the following detailed description when considered in connection with the accompanying drawings wherein.

DETAILED DESCRIPTION

Figure 1:
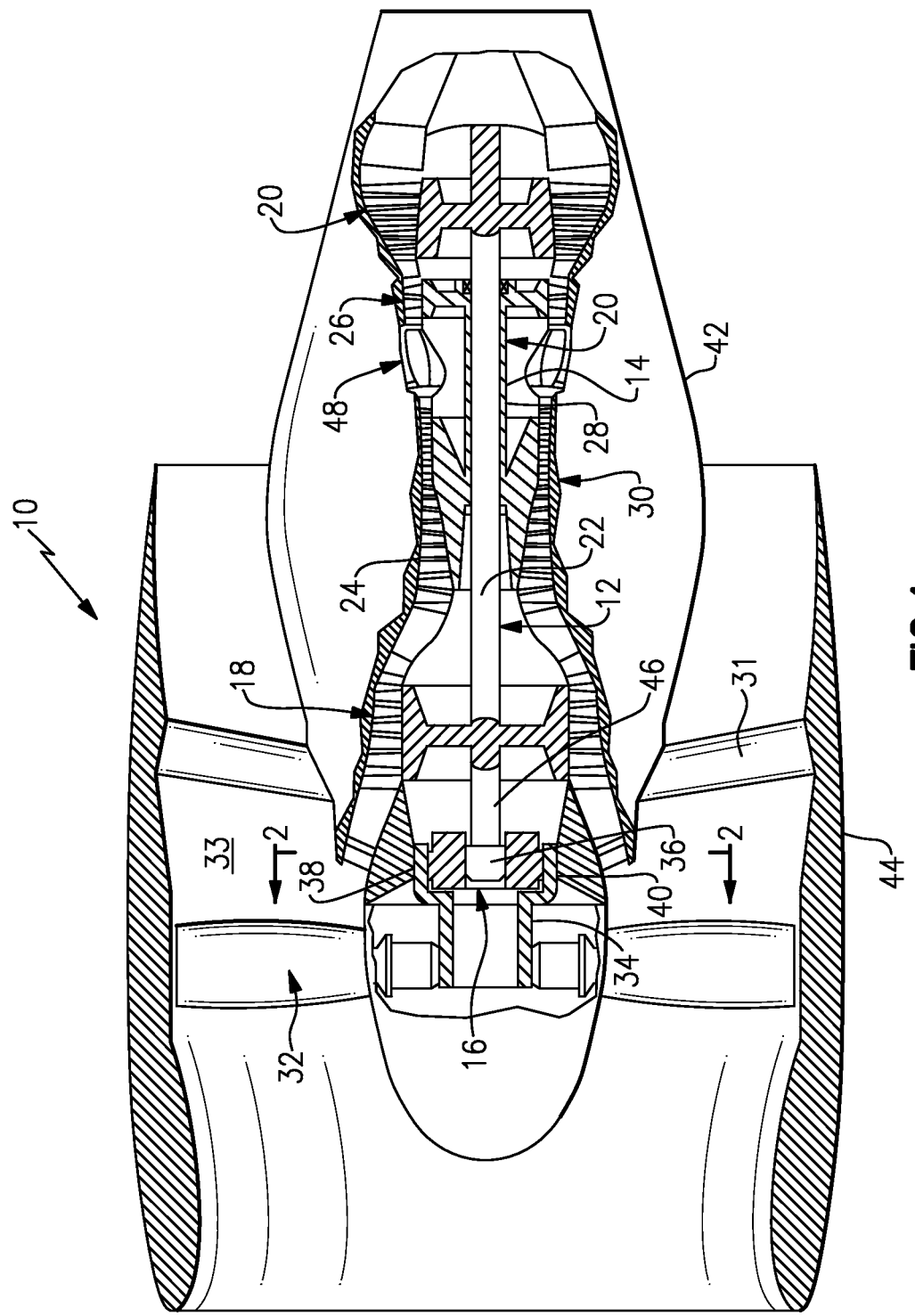
FIG. 1 is a schematic cross-sectional view of an example gas turbine engine.

An example gas turbine engine 10 is schematically illustrated in FIG. 1. The engine 10 includes turbo-machinery 30 having a compressor section 12 and a turbine section 14. The turbo-machinery 30 rotationally drives a fan 32, which is arranged in a bypass flow path 33, through an epicyclic gear train 16. The turbo-machinery 30 is housed within an inner nacelle 42. Flow exit guide vanes 31 arranged within the bypass flow path support the turbo-machinery 30 relative to a fan case, which is housed in a fan nacelle 44.

A low pressure compressor 18 and a low pressure turbine 20 are mounted on a low pressure spool 22. A high pressure compressor 24 and a high pressure turbine 26 are mounted on a high pressure spool 28. A combustor section 48 is arranged between the high pressure compressor 24 and the high pressure turbine 26.

The low pressure spool 22 rotationally drives a flex shaft 46 to which an input gear 36 (sun gear) is mounted for rotation about an axis A. Intermediate gears 38 (in the example, star gears) are arranged circumferentially about and intermesh with the input gear 36. A ring gear 40 surrounds and intermeshes with the intermediate gears 38. Either the intermediate gears 38 or the ring gear 40 rotationally drives the fan shaft 34 depending upon the type of epicyclic gear train configuration. A fan hub 35 is supported by and rotationally affixed to the fan shaft 34.

Figure 2:
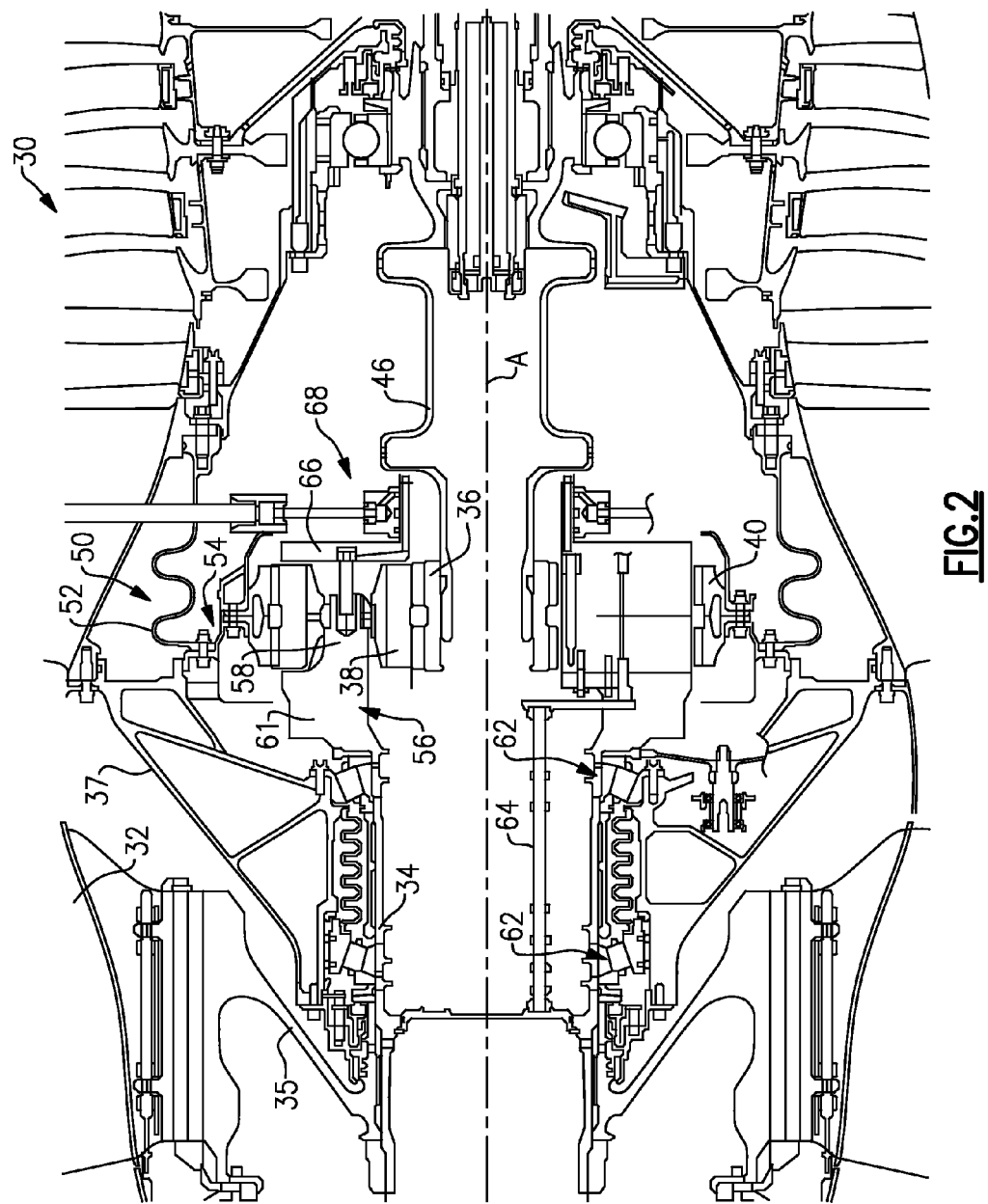
FIG. 2 is a cross-sectional view of an example fan drive gear system.

One example epicyclic gear train 16 is illustrated in FIG. 2. The epicyclic gear train 16 is the type in which the intermediate gears 38 (planet gears, in the example) rotate relative to the rotational axis of the input gear 36. That is, the planet gears are permitted to rotate about the rotational axis of the input gear 36. The turbo-machinery 30 includes fixed structure 50 comprising a bearing compartment case 52 and a ring gear support 54. A ring gear 40 is coupled to the ring gear support 54.

A torque frame 56 is integrated with the fan shaft 34 as a unitary structure. The torque frame 56 includes multiple shafts 58 integral with and extending from a base 61. In the example, the torque frame 56 includes five equally circumferentially spaced shafts 58 that correspondingly support five planet gears. The fan shaft 34, base 61 and shafts 58 of the torque frame 56 are unitary and formed by a one-piece structure, for example, by a forged steel structure. Other high strength metallic alloys, such titanium or nickel, may also be used.

Figure 3:
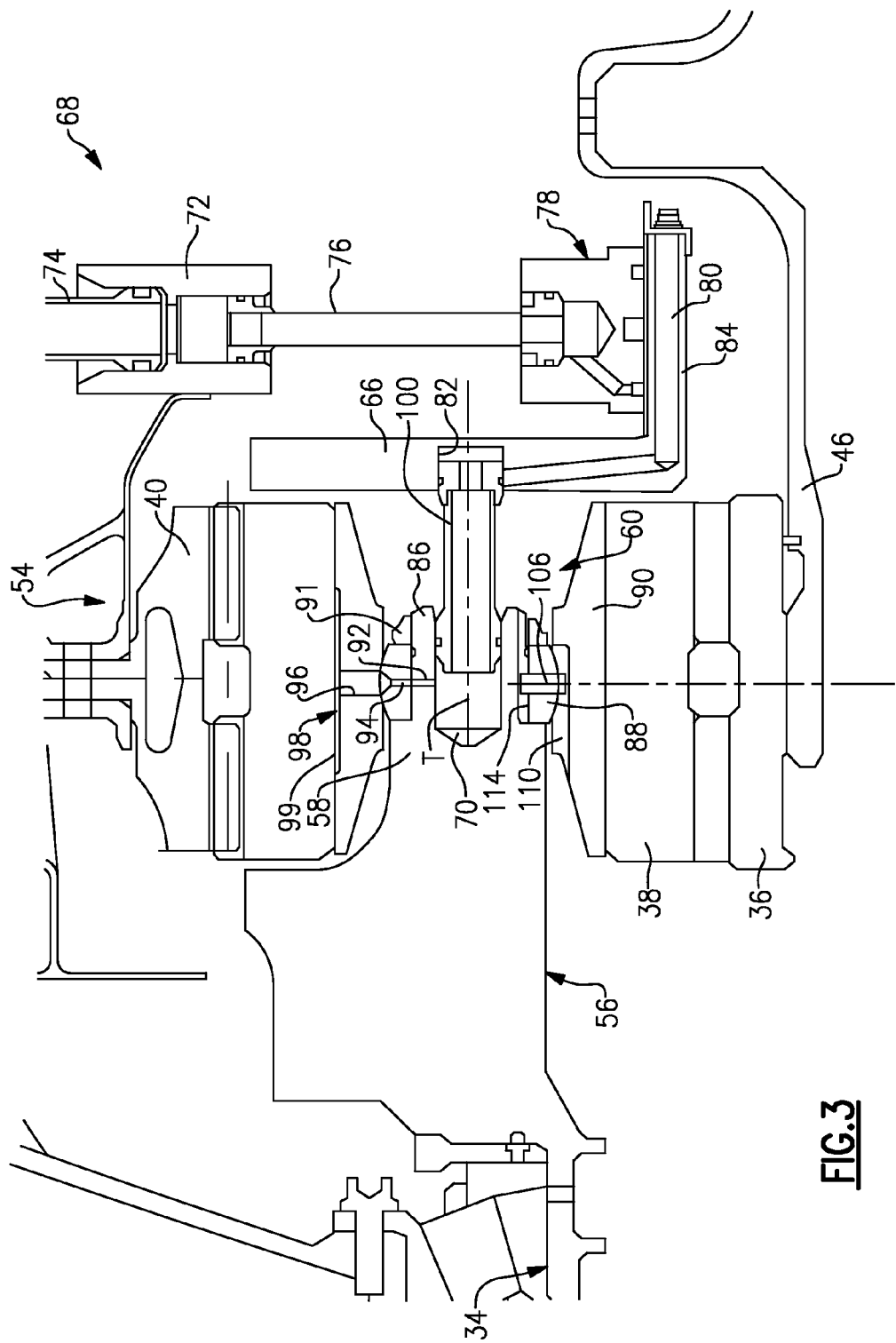
FIG. 3 is an enlarged cross-sectional view of a portion of the fan drive gear system illustrated in FIG. 2.

Referring to FIG. 3, the torque frame 56 includes oil passages to which oil must be transferred from the fixed structure 50 as the torque frame 56 rotates. For example, an oil passage 63 provides lubricating fluid to a spray bar 64 that delivers oil to output shaft bearings 62, which is supported by a front bearing housing 37. An oil transfer assembly 68 includes a transfer bearing 78 that is fixed and which mates to an oil baffle 66 that is secured to the rotating torque frame 56. A union 72 is affixed to the ring gear support 54 and receives lubricating fluid from a first transfer tube 74 that extends through the bearing compartment case 52. A second transfer tube 76 fluidly connects the union 72 to the transfer bearing 78, which is sealed to a collar 84 on the oil baffle 66.

The oil baffle 66 includes a passage 80 that conveys lubricating fluid to an aperture 82 that is aligned with each shaft 58. A tube 100 fluidly connects the aperture 82 to a passage 70 in the shaft 58.

Each shaft 58 includes a bearing assembly 60 for rotationally supporting its respective intermediate gear 38. The oil baffle 66 is secured to the torque frame 56 by fasteners 74. The oil baffle 66 is non-structural. That is, the oil baffle does not support the loads of the intermediate gears 38 as would a prior art carrier. As a result, the oil baffle 66 may be constructed from a considerably lower strength lighter weight material, such as an aluminum alloy or composite material.

Referring to FIG. 3, each shaft 58 includes an end 86 that supports a bearing assembly 60. The bearing assembly 60 includes a spherical bearing 88 supported in a race 90 on which the intermediate gear 38 is mounted. The ends 86 include a threaded portion that each receives a nut 91 securing the bearing assembly 60 to the shaft 58. The shaft 58, spherical bearing 88 and race 90 respectively include radially extending first, second and third passageways 92, 94, 96 that are aligned with one another to deliver lubricating fluid from the first passage 70 to bearing surfaces 98 provided between the race 90 and the intermediate gear 38. A recess 99 is provided in an outer diameter of the race 90 to increase lubrication at the bearing surfaces 98. In one example, the tube 100 includes a filter is arranged in a hole in the shaft 58 that provides a portion of the first passage 70.

Figure 5A:
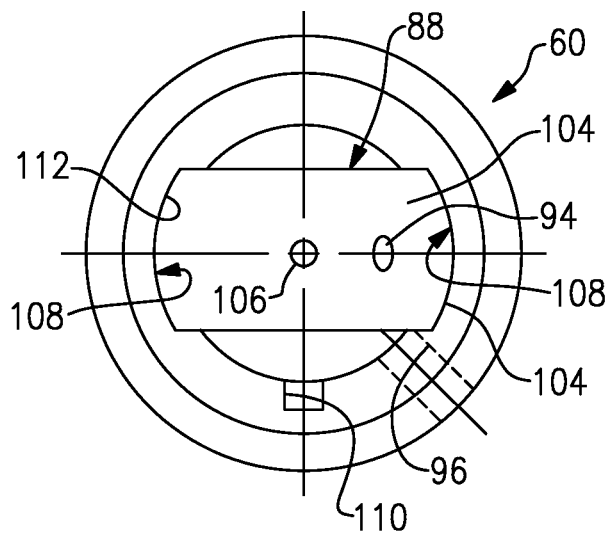
FIG. 5A is an elevational view of the spherical bearing of FIG. 4 inserted into a race in an assembly position.
Figure 5B:
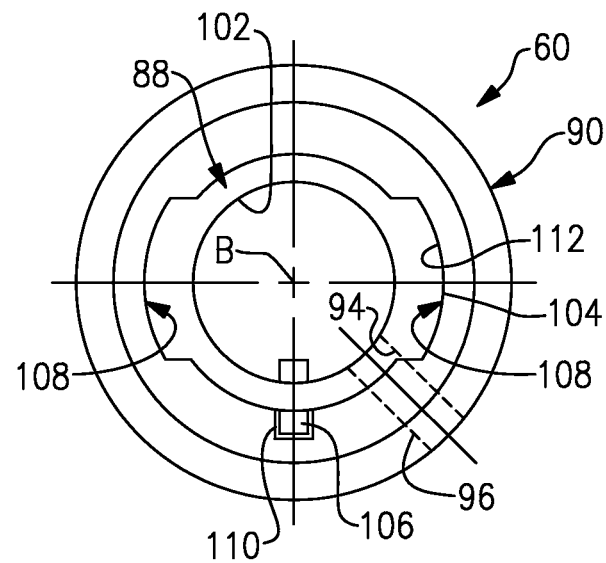
FIG. 5B is an elevational view of the spherical bearing of FIG. 4 fully assembled into the race to provide a bearing assembly.
Figure 4:
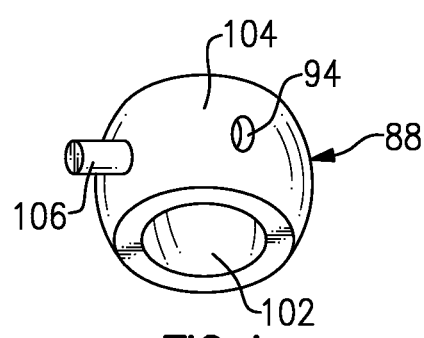
FIG. 4 is a perspective view of an example spherical bearing.

Referring to FIGS. 3-5B, the spherical bearing 88 includes an inner diameter 102 that is supported by the end 86. A convex surface 104 is provided on an outside of the spherical bearing 88 and mates with a corresponding concave surface 112 provided by an inner surface of the race 90 when fully assembled as illustrated in FIG. 5B. The spherical bearing 88 includes a pin 106 that extends through both the inner diameter 102 and the convex surface 104 in the example illustrated. The pin 106 is received by notches 110, 114 respectively provided in the race 90 and end 86 to prevent rotation of the spherical bearing 88 about a bearing axis B (FIG. 5B). The spherical bearing 88 permits angular movement of the bearing axis B relative to a shaft axis T (FIG. 3) provided by the shaft 58 during flexing of the shafts 58, which provides a near zero moment restraint.

FIGS. 5A and 5B illustrate the assembly process of the bearing assembly 60. The spherical bearing 88 is inserted into slots 108 of the race 90, as shown in FIG. 5A. The pin 106 is aligned with the notch 110 and the spherical bearing 88 is rotated to snap into engagement with the concave surface 112 with the pin 106 received in the notch 110. In this position, illustrated in FIG. 5B, the second and third passageways 94, 96 are aligned with one another.

Figure 6:
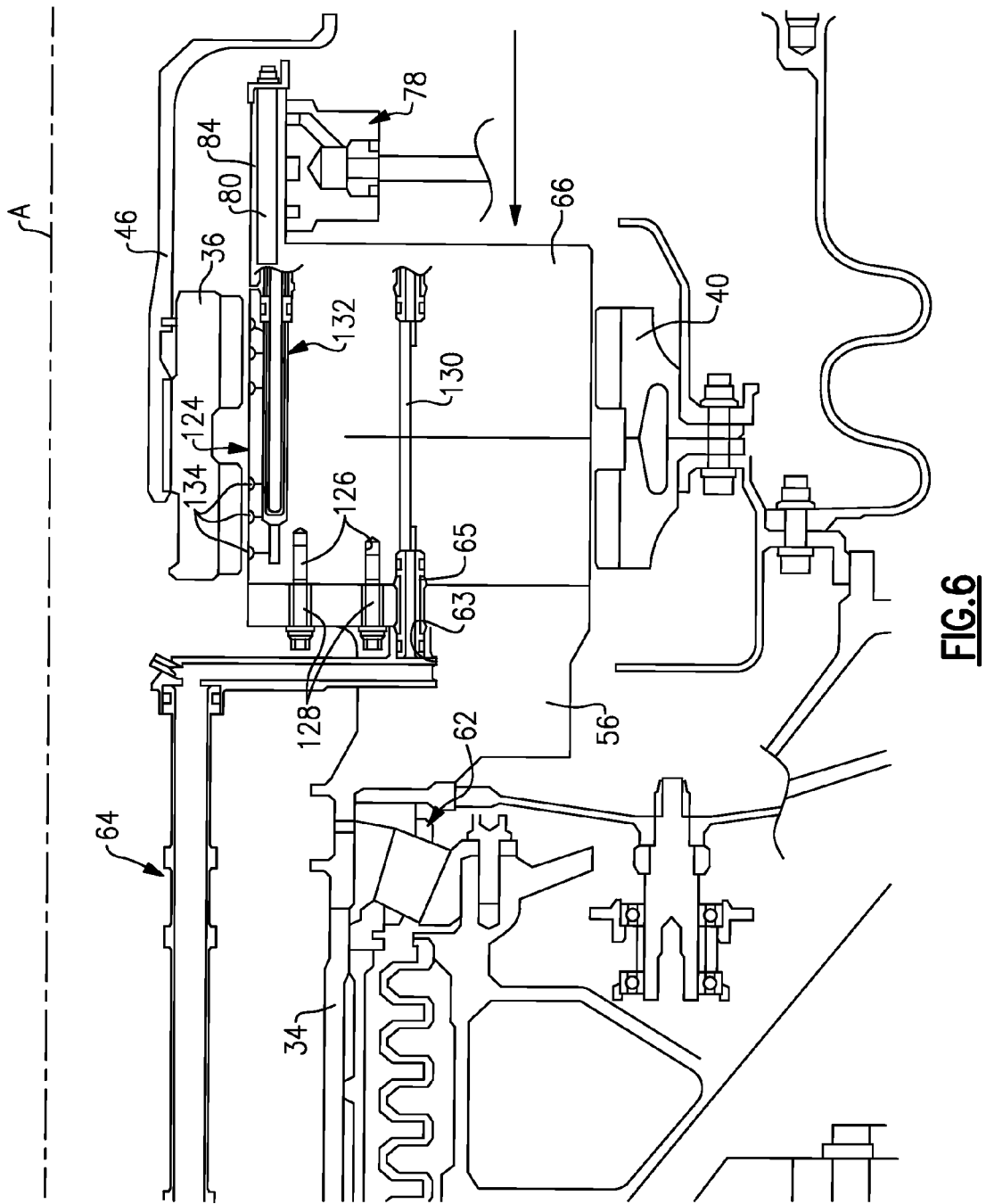
FIG. 6 is an enlarged cross-sectional view of another portion of the fan drive gear system illustrated in FIG. 2.

Both the torque frame 56 and the oil baffle 66 provide internal lubrication features for supplying lubricating fluid, such as oil, to the gears of the epicyclic gear train 16. Referring to FIG. 6, the passage 80 in the oil baffle 66 provides lubricating fluid to first and second passageways 130, 132. The first passageway 130 is fluidly connected to an oil passage 63 in the torque frame 56 via a tube 65. The first passageway 130 delivers oil to the spray bar 64. The second passageway 132 delivers lubricating fluid to a spray bar, which includes spray nozzles 134, provided integrally in the oil baffle 66. The second passageway 132 extends in a generally axial direction in the example shown, and the one or more spray nozzles 134 are transverse to the second passageway 132. In the example, the spray nozzles 134 are oriented to direct lubricating fluid radially inward at teeth 84 of the input gear 36.

Figure 7:
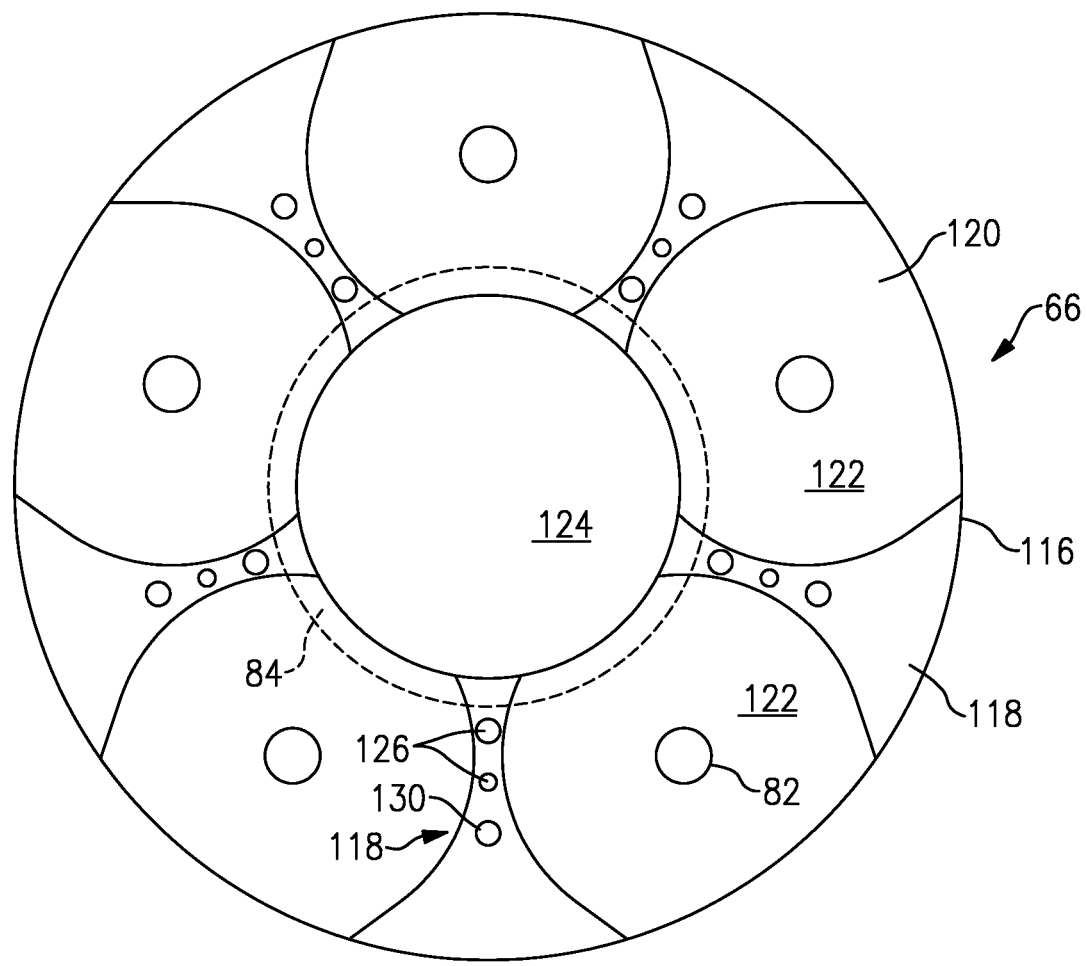
FIG. 7 is an elevational view of an example oil baffle used in the fan drive gear system and illustrated in FIGS. 2 and 3.

The oil baffle 66 is illustrated in more detail in FIGS. 6 and 7. The oil baffle 66 is provided by a body 116 having circumferentially spaced apart intermediate structures 118 axially extending from a wall 120. The intermediate structures 118 include the first passageway 130. The intermediate structures 118 define gear pockets 122 within which the intermediate gears 38 are received with the epicyclic gear train 16 fully assembled. Each gear pocket 122 includes the aperture 82 provided in the wall 120. The input gear 36 is received in a central opening 124 provided radially inward of the intermediate structures 118. Holes 126 are provided in the intermediate structures 118 and receive fasteners 128 to secure the oil baffle 66 to the torque frame 56, as illustrated in FIG. 6.

The epicyclic gear train 16 is assembled by first installing the fixed structure into the bearing compartment case 52, such as the oil transfer assembly 68 and the ring gear 40. The input gear 36 is supported on the flex shaft 46. The intermediate gears 38 are mounted on the torque frame 56, and the fan shaft 34 is rotationally mounted in the front bearing housing 37 by bearings 62. The torque frame 56, with its intermediate gears 38, is inserted between the input gear 36 and the ring gear 40 such that the gears intermesh with one another. The front bearing housing 37 is secured to the fixed structure 50. The fan hub 35 is slid onto and secured to the fan shaft 34.

Although an example embodiment has been disclosed, a worker of ordinary skill in this art would recognize that certain modifications would come within the scope of the claims. For that reason, the following claims should be studied to determine their true scope and content.

What is claimed is:

1. A fan gear drive system comprising:
   a torque frame comprising a base with integrated gear shafts circumferentially spaced relative to one another, a fan shaft integrated with the base, and each shaft providing a shaft axis;
   a bearing assembly mounted concentrically on each of the gear shafts and providing a bearing axis, the bearing assembly including a spherical bearing supported on the gear shaft and configured to permit angular movement of the bearing axis relative to the gear shaft axis, and a race mounted on the spherical bearing; and
   a gear supported for rotation about the bearing axis on a non-meshing support interface provided solely by the race, the gear configured to slidingly rotate on and about the race.

2. The system according to claim 1, comprising an input gear located radially inward from and intermeshing with intermediate gears supported on the gear shafts, and a ring gear arranged about and intermeshing with the intermediate gears, the input gear supported by an input shaft, and fixed structure supporting the ring gear.

3. The system according to claim 1, wherein the spherical bearing is received by the race, and a pin extending through the race, the spherical bearing and the gear shaft to prevent relative rotation between the race, the spherical bearing and the gear shaft about the gear shaft axis.

4. The system according to claim 3, wherein the torque frame includes a first passage provided through the gear shaft and configured to provide lubricating fluid to the gears, and the bearing assembly includes at least one passageway extending through each of the spherical bearing and the race and in fluid communication with the first passage.

5. The system according to claim 4, comprising an oil baffle fastened to the torque frame and in fluid communication with the first passage, the oil baffle includes circumferentially spaced apart intermediate structures providing gear pockets circumferentially between the intermediate structures that receive the gears, the oil baffle includes a second passage configured to receive lubricating fluid from an oil transfer assembly during rotation of the torque frame relative to the fixed structure.

6. The system according to claim 5, comprising a tube fluidly connecting the first and second passages from an end of the gear shaft to an aperture in a wall of the gear pocket.

7. The system according to claim 6, wherein the oil baffle includes third and fourth passages respectively fluidly connecting to first and second spray bars, the first spray bar is provided in the oil baffle and configured to direct lubricating fluid at teeth of at least one of the input gear and the intermediate gears, and the second spray bar is supported by the torque frame and in fluid communication with a fifth passage in the torque frame that is in fluid communication with the fourth passage.

8. The system according to claim 5, wherein the torque frame is constructed from a high strength metallic alloy, and the oil baffle is constructed from a lower strength lighter weight alloy than the high strength metallic alloy.

9. A fan drive gear drive lubrication system comprising:
a torque frame supporting multiple gears and including at least one lubrication passage;
an oil baffle secured to the torque frame and including a central opening and multiple circumferentially spaced gear pockets arranged about the central opening and receiving the multiple gears, the oil baffle including at least one lubrication passageway in fluid communication with the lubrication passage, wherein the torque frame includes a base with an integrated fan shaft and integrated gear shafts circumferentially spaced relative to one another and concentrically supporting the multiple gears; and
at least one tube extending between and fluidly interconnecting the lubrication passage and passageway;
wherein a bearing assembly is mounted on each gear shaft and includes a race receiving a spherical bearing, and at least one passageway extending through each of the spherical bearing and the race and in fluid communication with the lubrication passage; and
a gear supported for rotation about a bearing axis provided solely by the race, the gear configured to slidingly rotate on and about the race.

10. The system according to claim 9, wherein the oil baffle includes multiple circumferentially spaced intermediate structures defining the central opening and the multiple circumferentially spaced gear pockets that are arranged about the central opening and receive the multiple gears, an integrated spray bar provided by each intermediate structure and configured to direct lubricating fluid at teeth of a gear.

11. The system according to claim 9, wherein the oil baffle includes an annular collar extending axially from a wall, and a passage is configured to receive lubricating fluid from an oil transfer assembly that seals relative to the collar, the passage in fluid communication with multiple passages in each of the oil baffle and the torque frame for conveying the lubricating fluid to the spray bars.

12. A method of assembling a fan drive gear system comprising the steps of:
installing spherical bearings into respective races to provide bearing assemblies;
mounting one of the bearing assemblies concentrically onto each of a circumferential array of gear shafts provided on a torque frame as a one-piece, unitary structure;
supporting a gear for rotation about a bearing axis on a non-meshing support interface provided solely by the race, the gear configured to slidingly rotate on and about the race;
supporting the torque frame in a front bearing housing by bearings;
installing an intermediate gear onto the bearing assembly;
securing the front bearing housing to the fixed structure; and
securing a fan hub onto a fan shaft.

13. The method according to claim 12, wherein the installing step includes inserting a spherical bearing into slots in the race and rotating the spherical bearing and the race relative to one another to seat the spherical bearing within the race, and the installing step includes aligning first and second lubrication passageways provided in the spherical bearing and race with one another.

14. The method according to claim 12, comprising the steps of supporting an input shaft on a flex shaft, securing a ring gear onto a fixed structure, and inserting the intermediate gear and torque frame between the ring and input gears in intermeshing relationship.

15. The method according to claim 14, comprising the steps of supporting an oil transfer assembly on the fixed structure, and the inserting step includes mating an oil baffle with the oil transfer assembly.

16. The method according to claim 15, comprising the step of securing the oil baffle to the torque frame and fluidly connecting lubrication passages in the torque frame to lubrication passageways in the oil baffle.

17. The method according to claim 16, wherein the lubrication passageways include a spray bar facing an input gear.

* * * * *